United States Patent [19]

Brubaker et al.

[11] Patent Number: 4,595,626
[45] Date of Patent: Jun. 17, 1986

[54] CONFORMABLE TILE

[75] Inventors: Mary A. Brubaker, Providence Township, Lancaster County; Wendell A. Ehrhart; William Y. Whitmore, both of Hellam Township, York County, all of Pa.

[73] Assignee: Armstrong World Industries, Inc., Lancaster, Pa.

[21] Appl. No.: 695,678

[22] Filed: Jan. 28, 1985

[51] Int. Cl.$^4$ ............................................. B05D 7/00
[52] U.S. Cl. ................................... 428/220; 264/69; 428/482; 523/500; 523/513; 523/521
[58] Field of Search ................ 523/500, 513, 521; 524/914; 428/220, 482; 264/69

[56] References Cited

U.S. PATENT DOCUMENTS

| 3,078,249 | 2/1963 | Russell | 523/521 |
| 3,326,845 | 6/1967 | Arens et al. | 523/521 |
| 4,195,010 | 3/1980 | Russell et al. | 523/513 |
| 4,204,820 | 5/1980 | Toncelli | 425/89 |

FOREIGN PATENT DOCUMENTS 53-85884  7/1978  Japan ................................ 523/521

OTHER PUBLICATIONS

Breton; "Know-How" book; certain pages supplied by applicants in Information Statement; pp. 27, 28, 36-56 and 56/a-56/o.

*Primary Examiner*—Lewis T. Jacobs
*Attorney, Agent, or Firm*—Laird F. Miller

[57] ABSTRACT

The present invention relates to conformable tile products which may be formed from aggregate material and relatively low weight percentages of unsaturated polyester resin precursors. When cured, the tiles may be adhered to subfloors utilizing ordinary resilient flooring-type adhesives. Further, they will be conformable to subsurface irregularities, and will have high strength and impact resistance when installed as a flooring surface.

40 Claims, No Drawings

CONFORMABLE TILE

The present invention relates to tile, and more particularly to tile which will conform to the contours of the underlying surface.

BACKGROUND OF THE INVENTION

A variety of tile products are widely used in the building industry. Such products range from inexpensive types of products, such as vinyl-asbestos flooring tile, to substantially more costly tile products, such as marble tile. Although the latter are preferred due to their appearance, the use of such materials is not without problems. Ceramic and marble tiles are brittle and tend to crack; therefore, they require special installation techniques involving the setting of the tiles into ultimately rigid cement/mortar bases on a solid dimensionally stable subsurface, and the subsequent filling of the joints between the tiles with grout. Such procedures greatly add to the expense and are not always satisfactory.

THE PRIOR ART

Many attempts have been made to provide tile products which will have the pleasing appearance of natural products, yet which will be substantially less expensive than the natural products. Most emphasis has been placed on the preparation of synthetic vinyl products which are relatively inexpensive, yet which have an appearance similar to that of the natural products. Nevertheless, attempts have been made to use natural materials in a manner by which product costs and installation problems are reduced or avoided.

One such attempt is described in U.S. Pat. No. 3,278,662. This reference describes a stone-containing tile product which can be mass produced, and which can be used to avoid the problems which generally face the installer of terrazzo products. The tile product as disclosed therein contains about 7 to about 25 percent by weight of resin, and about 93 to about 75 percent by weight of stone particles. The components are compressed in a mold and cured; nevertheless, the resulting products are rigid in nature and have deficiencies which are similar to those noted with ceramic and marble tile products.

Another procedure has been commercialized by Breton S.p.A. of Castello di Godego, Italy, which developed the "bretonstone" technology. In this process, conventional polyester resin precursors are blended at low weight percentages with aggregate to provide a relatively dry mass of material which can be vibrated and compressed under vacuum and then cured to yield a rigid tile product. Apparatus which may be used to practice this procedure is disclosed in U.S. Pat. No. 4,204,820. Although highly attractive products can be produced, the difficulty of handling and installing these products is comparable to the problems associated with natural tile products. Thus, the rigidity of the tile has prevented the proper installation of the tile over common substrates (subfloors) using conventional resilient flooring adhesives.

Accordingly, one objective of the present invention is to provide a low-binder tile product which will conform to an irregular underlying surface, yet which will provide a natural, marble-like tile appearance.

Another objective of the present invention is to provide a tile product which will be readily adherable to support surfaces using synthetic-tile processes, yet which will provide an appearance and performance comparable to natural marble tile products.

These and other advantages of the present invention will be apparent from the detailed description of preferred embodiments which follow.

SUMMARY OF THE INVENTION

The present invention relates to conformable tile products which may be formed from aggregate material and relatively low weight percentages of unsaturated polyester resin precursors. When cured, the tiles may be adhered to subfloors utilizing ordinary resilient flooring-type adhesives. Further, they will be conformable to subsurface irregularities, and will have high strength and impact resistance when installed as a flooring surface.

DETAILED DESCRIPTION OF PREFERRED EMBODIMENTS

In one embodiment, the present invention relates to a conformable tile, said tile being derived from a composition comprising by weight from about 4 to about 10 percent of a resin precursor derived from about 10 to about 60 parts by weight of monomeric diluent and from about 90 to about 40 parts by weight of an unsaturated polyester derived essentially from at least one glycol and at least one unsaturated difunctional acid or acid derivative and, optionally, a saturated difunctional acid or acid derivative, said polyester having an end group analysis molecular weight of from about 600 to about 3,600, said parts of said diluent and said polyester being based on a total of 100 parts of diluent and polyester, said resin precursor being capable of demonstrating a Shore C hardness of from about 20 to about 60 when formed in a fully cured unfilled casting; from about 96 to about 90 percent of an inorganic aggregate material, at least 20 percent by weight of said aggregate being sufficiently small to pass through a 0.1-millimeter screen and at least 35 percent by weight of said aggregate being retained on a 1-millimeter screen; and, optionally, an effective amount of curing initiator, the percentage of said resin precursor and said aggregate being based on a total of 100 percent of resin precursor and aggregate.

In a second embodiment, the present invention relates to a process for forming a conformable tile, said process comprising the steps of preparing a composition comprising by weight (a) from about 4 to about 10 percent of a resin precursor derived from about 10 to about 60 parts by weight of monomeric diluent and from about 90 to about 40 parts by weight of an unsaturated polyester derived essentially from at least one glycol and at least one unsaturated difunctional acid or acid derivative and, optionally, a saturated difunctional acid or acid derivative, said polyester having an end group analysis molecular weight of from about 600 to about 3,600, said parts of said diluent and said polyester being based on a total of 100 parts of diluent and polyester, said resin precursor being capable of demonstrating a Shore C hardness of from about 20 to about 60 when formed in a fully cured unfilled casting, (b) from about 96 to about 90 percent of an inorganic aggregate material, at least 20 percent by weight of said aggregate being sufficiently small to pass through a 0.1-millimeter screen and at least 35 percent by weight of said aggregate being retained on a 1-millimeter screen, and, (c) optionally, an effective amount of curing initiator, the percentages of said resin precursor and said aggregate being based on a total of 100 percent of resin precursor and aggregate; intimately mixing said composition to provide a formable mass; compressing said formable mass in a vibrating mold under vacuum; and curing the molded material.

The polyester resin precursors which may be used to practice the present invention will preferably be liquid and will be derived from monomeric diluents and unsaturated polyesters. Typical diluents are styrene, vinyl toluene, N-vinylpyrrolidone, and acrylate and methacrylate esters, styrene being preferred; nevertheless, other diluents may be utilized by an ordinary artisan.

The unsaturated polyesters will be derived from one or more glycols and an unsaturated dicarboxylic acid component, preferably comprising at least one acid or acid derivative selected from the group consisting of maleic acid, fumaric acid, itaconic acid, or the anhydrides or esters thereof. Optionally, a multi-functional saturated alkyl or aromatic carboxylic acid or acid derivative may also be included. The polyester may be prepared by conventional techniques to have an end group analysis molecular weight of from about 600 to about 3,600, but preferably of from about 1100 to about 2300. It must be recognized that it is not mandatory that either acid component be in the acid form when used to prepare the polyester. It is well known in the art that esters of acids derived from volatile alcohols, and also acid anhydrides, may be used in place of the acid when preparing polyesters. Accordingly, the term "acid or acid derivative" as used herein is deemed to include appropriate esters and anhydrides of the indicated acid.

The acid component used to prepare the polyester may comprise only the aforementioned unsaturated acids, or acid derivatives, or it may also comprise other multi-functional saturated alkyl or aromatic carboxylic acids and/or their derivatives. The objective will be to provide a polyester which will have the ability to copolymerize with the monomeric diluent to provide unsaturated polyester resins having the characteristics indicated below.

To prepare the unsaturated polyester resin precursor, a total of 100 parts by weight of diluent and unsaturated polyester will be intermixed. Of this, about 10 to about 60 parts will comprise diluent and about 90 to about 40 parts will comprise polyester. Preferably, however, the resin precursor will comprise about 10 to about 45 parts of diluent and 90 to about 55 parts of polyester. Where the preferred diluent, styrene, is used, the resin precursor will preferably comprise about 10 to about 35 parts of styrene and about 90 to about 65 parts of polyester.

In addition to the mandatory diluent and polyester components, the mixture will preferably include a stabilizer to prevent the premature curing of the components. Such stabilizers are well known in the art and include hydroquinone, p-methoxyphenol, 2,5-di-t-butylhydroquinone, 4-t-butylcatechol, phenothiazine, and the like. Supplemental stabilizers, such as N,N-diethylhydroxylamine and triethylphosphite, which tend to decompose unwanted peroxides via a non-free radical mechanism, may also be used. It will be understood, however, that the quantities of stabilizer, and any other additives, are not included in the 100 parts of polyester and diluent.

Ordinarily, to obtain an adequate pot life when preparing the polyester resin precursors, it is desirable to avoid mixing the initiator(s) and promoter(s) (if used) until a point in time just prior to the use of the resin precursor in the tile-making process or the curing of the resin precursor for hardness testing, the latter being discussed more fully below. Initiators, as indicated by their name, serve to induce the polymerization of the unsaturated polyester and the diluent. The materials are well-known in the art and include free-radical initiators such as peroxides and the like. Examples of typical initiators are peroxyesters, such as t-butylperoxy 2-ethylhexanoate, t-butylperoxy benzoate, and t-amylperoxy 2-ethylhexanoate; ketone peroxides such as methyl ethyl ketone peroxide; and diacyl peroxides such as dibenzoyl peroxide. Promoters serve to reduce the temperature at which the initiator is effective and, thus, facilitate the polymerization. Examples of typical promoters are metal salts of organic acids, such as cobalt naphthenate, manganese neodecanoate and copper octoate; tertiary amines such as N,N-dimethylaniline; combinations of these materials; and acetyl acetone. It is noted, however, that the cobalt salts are especially preferred.

Preferably, the resin precursors will be cured thermally, in which case the use of an initiator will be required. Nevertheless, it will be recognized that curing may be achieved by exposing the material to electron beam irradiation, in which case neither initiators nor promoters will be necessary. Electron beam curing is not preferred, however, because the density of the material may interfere with the ability of the beam to penetrate the structure. In addition, an electron beam curing apparatus is quite expensive, and its use is not always economically practical.

The uncured polyester resin precursor will normally be in a liquid form so that it can be mixed with the aggregate material to provide a formable mass. Thus, the polyester should preferably be a liquid polyester or a fairly low melting polyester which can be easily mixed with the diluent. As a further consideration, the resin precursor must be curable to provide a resin having certain defined characteristics. The properties of the resin cannot be easily characterized when the mixture of resin precursor and aggregate is fully cured because the aggregate will interfere with the measurement. Therefore, the suitability of the resin should be determined by preparing a fully cured unfilled casting of the resin and then determining its Shore C hardness using a Shore C durometer. Alternatively, an artisan may wish to determine the hardness by measuring the Shore D hardness essentially according to ASTM D 2240, and then converting the Shore D measurements to Shore C values through the use of conversion tables which are well known in the art.

The use of a Shore C hardness to determine the suitability of a cured unsaturated polyester resin is highly unusual. Cured unsaturated polyester resins are typically quite hard, and their hardness is normally measured using a Barcol hardness scale, rather than a Shore C scale. In order for the cured resins of the present invention to be suitable, they must have a Shore C hardness between 60 and 20, but most preferably between 50 and 30. By way of comparison, a Barcol hardness tester (Model GYZJ 936) would be incapable of recording a hardness for the soft materials used to practice the present invention. As will later be shown in the examples, a Barcol hardness of about 50 is conventionally required for rigid prior art cured unsaturated polyesters which are presently used to prepare flooring tile.

The aggregate which will be used to practice the present invention may comprise a single type of material or a mixture of materials, examples of which are limestone (marble), quartz, granite, and the like. It is noted that fairly hard materials which will withstand wear in a flooring environment are preferred; however, for specialized uses such as wall tile, softer materials may also be selected. The aggregate must comprise large size particles in order to provide pleasing visual effects, and also smaller size particles which will serve as fillers. Considered as a whole, at least 20 percent, but preferably at least 25 percent, of the particles will pass through a 0.1-millimeter screen and at least 35 percent, but preferably at least 40 percent, will be retained on a 1-millimeter screen. For typical tile products of the present invention, the largest particles will be not larger than about 40 millimeters in cross section, but preferably not larger than 20 millimeters. Based on 100 parts of aggregate and resin precursor, the aggregate will comprise from 96 to about 90 percent by weight of the composition and the resin precursor will comprise 4 to about 10 percent by weight of the composition. Preferably, however, the aggregate will comprise 94.5 to 92.5 percent by weight of the composition and the resin precursor will comprise 5.5 to 7.5 percent by weight of the composition.

To practice the present invention using a thermal curing procedure, the polyester is prepared by conventional chemical processing equipment and is combined with the monomeric diluents and, optionally, stabilizers.

Immediately prior to use the mixture is combined with the curing initiators, and optional promoters and other additives. The resulting liquid resin precursor is intimately mixed with the aggregate to provide a substantially dry formable mass of material. A particularly preferred method of mixing is to use an epicyclical mixer such as that produced and sold by Breton, S.p.A., as referred to above. The intermixed material should preferably be in a dry state so that it can easily be distributed in the mold. By "dry" it is meant that the particles will be coated with the preferably liquid resin precursor so as to provide a material having the consistency of damp sand such that, when a hand-full of the material is clutched firmly by hand and the hand is opened, the material will essentially retain its compressed shape. Once the material is intermixed, it is distributed in a mold and subjected to vibration under vacuum in combination with pressure. The vacuum will preferably be less than 200 mm of mercury, and most preferably less than 160 mm of mercury. The vacuum and the vibration assist in removing air from the resulting mass and, in combination with the pressure, produces a solid sheet. The sheet may then be thermally cured by subjecting it to heat.

A variety of options may be utilized in preparing the final product. The tile may be used as is, but preferably, in a production environment, it will be formed in a relatively thick sheet which may then be sawed or otherwise divided into individual tiles. In order to enhance the visual effects of the resulting tile with embedded aggregate, the tile face may be ground and polished using conventional equipment to yield a product having a unique visual appearance. The final thickness of the ground and polished product should be not more than about 0.3 inch and, more preferably, not more than about 0.25 inch. Most preferably, the product should have a thickness of 0.2 inch or less to ensure that the tile will be easily conformable and to minimize the weight and cost of the materials.

Further understanding regarding the present invention and the advantages inherent in using said invention will become apparent from the examples, said examples being provided by way of illustration and not limitation.

EXAMPLE 1

This example will illustrate the preparation of the polyesters. All of the components were charged into a 5- to 10-liter, three-neck flask fitted with a nitrogen sub-surface bubbler, a stirrer, a thermometer, a jacketed 18-inch distilling column equipped with a still head having a water cooled condenser, and a graduated distillate collector. In addition, each reaction mixture also included by weight 0.009% hydroquinone stabilizer and 0.09% butyl stannoic acid catalyst. The stirred reaction mixture was rapidly heated to a maximum temperature of 220° C. while the flask was continually swept with a nitrogen flow of 1-2 standard cubic feet per hour (SCFH). Water immediately began to distill, and the temperature was maintained at 220° C. until the approximate theoretical amount of water had been removed. For most polyesters, an acid number of 2±2 was obtained. The following polyesters were prepared:

| | Acids - Equivalents (Weight) | | | | Glycols - Equivalents (Weight) | | | | | | |
|---|---|---|---|---|---|---|---|---|---|---|---|
| Sample | IPA | AZA | FA | MA | CHDM | 1,6-HD | TPG | SR-100 | P-710 | Acid No. | OH No. |
| 1A | 0.5 (42 g) | 12.2 (1147 g) | 7.3 (423 g) | — | 4.0 (320 g) | 20.4 (1204 g) | — | — | — | 0.42 | 81.0 |
| 1B | 0.5 (42 g) | 11.8 (1109) | 7.7 (447 g) | — | 12.0 (960 g) | 12.7 (749 g) | — | — | — | 0.48 | 80.4 |
| 1C | 7.0 (581 g) | 5.5 (517 g) | 7.5 (435 g) | — | 14.0 (1120 g) | 10.7 (631 g) | — | — | — | 0.40 | 81.6 |
| 1D | 13.5 (1121 g) | — | 6.5 (377 g) | — | 11.0 (880 g) | — | — | 13.6 (1952 g) | — | 0.36 | 59.1 |
| 1E | 10.8 (896 g) | — | 9.2 (534 g) | — | 9.5 (760 g) | — | — | 15.0 (2153 g) | — | 0.48 | 60.6 |
| 1F | 5.0 (415 g) | — | 15.0 (870 g) | — | 9.5 (760 g) | — | — | 15.0 (2153 g) | — | 0.50 | 61.3 |
| 1G | 11.4 (946 g) | — | 8.6 (499 g) | — | — | — | 14.0 (1344 g) | 9.6 (1378 g) | — | 3.00 | 56.1 |
| 1H | — | — | — | 20.0 | 10 | — | — | — | 16.0 | 15.00 | 58.6 |

-continued

| | Acids - Equivalents (Weight) | | | | Glycols - Equivalents (Weight) | | | | | |
|---|---|---|---|---|---|---|---|---|---|---|
| Sample | IPA | AZA | FA | MA | CHDM | 1,6-HD | TPG | SR-100 | P-710 | Acid No. | OH No. |
| | | | | (980 g) | (800 g) | | | | (6192 g) | | |

Key:
IPA = Isophthalic Acid
AZA = Azelaic Acid
FA = Fumaric Acid
MA = Maleic Acid
CHDM = Cyclohexanedimethanol (90% aqueous solution; effective equivalent weight = 80.0)
1,6-HD = 1,6-Hexanediol
P-710 = polypropylene oxide diol from Wyandotte; mol wt = 775
TPG = Tripropylene Glycol
SR-100 = Sartomer SR-100 Diol (consists primarily of $C_{13}$–$C_{15}$ straight-chain diols)

EXAMPLE 2

This example will illustrate the preparation of the polyester resin precursor. Each of the polyesters of Example 1 was cooled to ca 80° C. under nitrogen and an additional 125 ppm of hydroquinone stabilizer (based on the weight of the polyester and the eventually used styrene diluent) was added to the flask. Subsequently, 500 ppm of N,N-diethylhydroxylamine supplemental stabilizer (based on the weight of the polyester and the styrene) was dissolved in the styrene. The mixture of styrene and stabilizer was then added with stirring to the flask containing the polyester in the presence of dry air. Stirring was continued to provide a homogeneous liquid resin precursor which was storage stable.

The following resin precursors will be illustrative of those which may be used to practice the present invention. Two resin precursors which will not be suitable are also included. In all instances, styrene was used as the monomeric diluent.

| Sample | Polyester | Styrene (%) | Viscosity (cps at 27° C.) | Shore C Hardness |
|---|---|---|---|---|
| 2A | 1A | 26.0 | 390 | 43 |
| 2B | 1B | 26.0 | 590 | 55 |
| 2C | 1C | 26.0 | 1250 | 74 |
| 2D | 1D | 18.0 | 2750 | 32 |
| 2E | 1E | 23.4 | 1150 (25° C.) | 47 |
| 2F | 1F | 26.0 | 620 | 86 |
| 2G | 1G | 22.2 | 710 | 40 |
| 2H | 1H | 25.0 | 1200 | 45 |

Viscosity measurements were made on resin precursors which contained no initiators or promoters. Shore C hardness measurements were made by mixing samples of the resin precursors with 5 percent Esperox 28PD (t-butylperoxy 2-ethylhexanoate in dioctyl phthalate plasticizer (1:1)) initiator and 0.3 percent cobalt naphthenate promoter (6% Cobalt Nap-All from Mooney Chemicals, Inc.). The unfilled samples were completely cured by heating them for 30 minutes at 80° C. These results indicate that samples 2C and 2F have a very high Shore C hardness relative to the other samples.

The measurements were made using a Shore C durometer; however, as previously indicated, Shore D measurements could also have been made essentially according to ASTM D 2240, and the measured values could then have been converted to Shore C values. Known conversions are as follows:

| Shore D Value | Equivalent Shore C Value |
|---|---|
| 58 | 77 |
| 46 | 70 |
| 39 | 59 |
| 33 | 52 |
| 29 | 47 |
| 25 | 42 |
| 22 | 37 |
| 19 | 32 |
| 16 | 28 |
| 14 | 24 |
| 12 | 20 |
| 10 | 17 |
| 8 | 14 |

EXAMPLE 3

This example will illustrate the preparation of tile products according to the present invention using the liquid resin precursors of Example 2. The following percentage composition was utilized:

| Components | Weight Percent |
|---|---|
| Resin precursor | 7.20 |
| Cedar colored marble stone (6 mm maximum) | 34.95 |
| Pink colored marble stone (6 mm maximum) | 34.95 |
| Limestone (275–325 mesh) | 22.90 |
| Total | 100.00% |

Also included in the composition were quantities of Esperox 28PD initiator and cobalt naphthenate promoter amounting to 5.0 and 0.3 percent of the weight of the resin precursor, respectively. These amounts were not included in the percentage calculation.

The components were intimately mixed using a Hobart planetary mixer, and the generally powdery mixed components were evenly distributed in a mold in a Breton vibropress. The press was closed and evacuated to an internal pressure of ca 160 mm of mercury, after which the ram was lowered and the pressure was reduced to ca 60 mm of mercury. A compression of 29.5 psi was applied for 1 minute and 45 seconds, after which the consolidated material was removed from the mold. The molded samples were then cured for 30 minutes at 222° F. The resulting tile was gauged and polished to a final thickness of 195 mils (±5 mils).

Sample specimens 2-inch by 12-inch were cut from each tile and placed across an 8-inch span. A 1.5-pound weight was then applied in the center of the span and the sample was permitted to stand for 5 minutes, after which the deflection from the initial plane was measured. The following results were obtained:

| Sample | Resin | Sag (mils) | Result |
| --- | --- | --- | --- |
| 3A | 2A | 81 | A |
| 3B | 2B | 34 | A |
| 3C | 2C | 11 | U |
| 3D | 2D | 113 | A |
| 3E | 2E | 53 | A |
| 3F | 2F | 14 | U |
| 3G | 2G | 51 | A |

Conformable tiles were acceptable (A) if they deflected at least 20 mils; otherwise, they were considered to be non-conformable (i.e. rigid) and, therefore, were classed as unsatisfactory (U). It will be noted that unsatisfactory non-conforming tiles 3C and 3F were prepared from resin precursors 2C and 2F which had very high Shore C hardness values relative to the other resin precursors that yielded acceptable tiles.

EXAMPLE 4

This example will illustrate the preparation of a conformable commercial flooring tile utilizing a Breton epicyclical mixer and Breton vibropress. The sample was prepared using resin precursor 2G, Esperox 28PD initiator and cobalt naphthenate promoter. The marble stone (6 mm maximum) and limestone had the following particle size distributions.

| | % Retained on Sieve | |
| --- | --- | --- |
| Sieve Size | Marble Stone | Limestone |
| 3 millimeter | 18 | — |
| 2 millimeter | 26 | — |
| 1 millimeter | 25 | — |
| 0.2 millimeter | 18 | 3.0 |
| 0.1 millimeter | 5.5 | 10.0 |
| 0.04 millimeter | 6 | 30.0 |
| Residue | 1.5 | 57.0 |

Three separate batches of components were mixed in order to provide a rose quartz colored product. The following components were mixed in separate mixers.

| Component | Mixer 1 | Mixer 2 | Mixer 3 |
| --- | --- | --- | --- |
| Resin (Kg) | 14.9 | 11.6 | 14.9 |
| Limestone (Kg) | 65 | 50 | 65 |
| Marble stone (pink, Kg) | 160 | — | 160 |
| Marble stone (cedar, Kg) | — | 140 | — |
| Initiator (grams) | 735 | 580 | 735 |
| Promoter (grams) | 44.1 | 34.8 | 44.1 |
| Cedar pigment (grams) | 240 | 200 | 240 |

The components were mixed for 15–45 seconds to provide a mixture of material having the consistency of damp sand. All three mixes were placed in a single blender and blended for 30–45 seconds, and then conveyed to a series of 1 ¾-inch thick frames on a paper covered conveyor. The frames had a dimension of about 52 inches by 52 inches, and the material was evenly distributed therein. The frames were removed and the formed material was then conveyed to a Breton vibropress and covered with paper. The vibropress was closed and a vacuum of ca 200 mm was drawn. Thereafter, the ram was lowered and a vacuum of ca 160 mm was drawn as a pressure of 4–5 bars was applied to the material for 1.5–1.75 minutes. Upon removal of the compressed material from the vibropress, the paper covered consolidated material was conveyed to an oven. The material was placed between oil-heated platens such that the material was heated at between 90 and 100° C. for at least 20 minutes.

After the slabs were cured, they were allowed to cool and were then ground to give material having a thickness of ca. 960 mils. The 960-mil thick slab was sawed, ground and polished to yield 32 tiles measuring 12 inches by 12 inches by 190 mils.

For comparison, a control sample was selected which had been manufactured commercially by ArmStar Venture Associates as a 12-inch by 12-inch by 375-mil Armstone polymer concrete "white sand" tile (pattern No. 8001). This sample had been prepared using the standard conditions recommended by Breton from an unsaturated polyester resin precursor which, when cured in an unfilled casting, would give a Barcol hardness of about 50. To obtain an adequate comparison, the back of the tile was ground until a thickness of 190 mils was obtained.

Both tiles were subjected to a sag test. The sample derived from the commercial rigid polyester showed a deflection after 5 minutes of 3 mils whereas the tile produced according to the present invention showed a sag of 45 mils. These results indicate that the tile prepared according to the present invention would be conformable to an uneven subsurface, but that the tile prepared according to the prior art was rigid and would not conform to an uneven subsurface.

The present invention is not restricted solely to the descriptions and illustrations provided above, but encompasses all modifications envisaged by the following claims.

What is claimed is:

1. A conformable tile, said tile being derived from
    a composition comprising by weight from about 4 to about 10 percent of a resin precursor derived from about 10 to about 60 parts by weight of monomeric diluent and from about 90 to about 40 parts by weight of an unsaturated polyester derived essentially from at least one glycol and at least one unsaturated difunctional acid or acid derivative and, optionally, a saturated difunctional acid or acid derivative, said polyester having an end group analysis molecular weight of from about 600 to about 3600, said parts of said diluent and said polyester being based on a total of 100 parts of diluent and polyester, said resin precursor being capable of demonstrating a Shore C hardness of from about 20 to about 60 when formed in a fully cured unfilled casting;
    from about 96 to about 90 percent of an inorganic aggregate material, at least 20 percent by weight of said aggregate being sufficiently small to pass through a 0.1-mm screen and at least 35 percent by weight of said aggregate being retained on a 1-mm screen; and
    optionally, an effective amount of curing initiator, the percentage of said resin precursor and said aggregate being based on a total of 100 percent of resin precursor and aggregate.

2. The invention as set forth in claim 1 hereof wherein said unsaturated acid is selected from the group consisting of maleic acid, fumaric acid and itaconic acid.

3. The invention as set forth in claim 2 hereof wherein said diluent is selected from the group consisting of styrene, vinyl toluene, N-vinylpyrrolidone and acrylate and methacrylate esters.

4. The invention as set forth in claim 3 hereof wherein said composite comprises about 94.5 to about 92.5 percent aggregate and from about 5.5 to about 7.5 percent resin precursor.

5. The invention as set forth in claim 4 hereof wherein said resin precursor comprises from about 10 to about 45 parts of diluent and from about 90 to about 55 parts of polyester.

6. The invention as set forth in claim 5 hereof wherein said diluent is styrene.

7. The invention as set forth in claim 6 hereof wherein said resin precursor comprises from about 10 to about 35 parts of styrene and from about 90 to about 65 parts of polyester.

8. The invention as set forth in claim 7 hereof wherein the molecular weight of said polyester is from about 1100 to about 2300.

9. The invention as set forth in claim 7 hereof wherein curing is thermally achieved using a peroxyester initiator and a cobalt salt of an organic acid as the promoter.

10. The invention as set forth in claim 1 hereof wherein said Shore C hardness range is from about 30 to about 50.

11. The invention as set forth in claim 10 hereof wherein said unsaturated acid is selected from the group consisting of maleic acid, fumaric acid and itaconic acid.

12. The invention as set forth in claim 11 hereof wherein said diluent is selected from the group consisting of styrene, vinyl toluene, N-vinylpyrrolidone and acrylate and methacrylate esters.

13. The invention as set forth in claim 12 hereof wherein said composite comprises about 94.5 to about 92.5 percent aggregate and from about 5.5 to about 7.5 percent resin precursor.

14. The invention as set forth in claim 13 hereof wherein said resin precursor comprises from about 10 to about 45 parts of diluent and from about 90 to about 55 parts of polyester.

15. The invention as set forth in claim 14 hereof wherein said diluent is styrene.

16. The invention as set forth in claim 15 hereof wherein said resin precursor comprises from about 10 to about 35 parts of styrene and from about 90 to about 65 parts of polyester.

17. The invention as set forth in claim 16 hereof wherein the molecular weight of said polyester is from about 1100 to about 2300.

18. The invention as set forth in claim 16 hereof wherein curing is thermally achieved using a peroxyester initiator and a cobalt salt of an organic acid as the promoter.

19. The invention as set forth in claim 6 hereof wherein said aggregate comprises particles not larger than 20 mm in diameter and wherein said tile product is ground and polished to a thickness of not more than 0.3 inch.

20. The invention as set forth in claim 19 hereof wherein said thickness is not more than about 0.25 inch.

21. A process for forming a conformable tile, said process comprising the steps of
preparing a composition comprising by weight (a) from about 4 to about 10 percent of a resin precursor derived from about 10 to about 60 parts by weight of monomeric diluent and from about 90 to about 40 parts by weight of an unsaturated polyester derived essentially from at least one glycol and at least one unsaturated difunctional acid or acid derivative and, optionally, a saturated difunctional acid or acid derivative, said polyester having an end group analysis molecular weight of from about 600 to about 3600, said parts of said diluent and said polyester being based on a total of 100 parts of diluent and polyester, said resin precursor being capable of demonstrating a Shore C hardness of from about 20 to about 60 when formed in a fully cured unfilled casting, (b) from about 96 to about 90 percent of an inorganic aggregate material, at least 20 percent by weight of said aggregate being sufficiently small to pass through a 0.1-mm screen and at least 35 percent by weight of said aggregate being retained on a 1-mm screen, and optionally, (c) an effective amount of curing initiator, the percentages of said resin precursor and said aggregate being based on a total of 100 percent of resin precursor and aggregate;
intimately mixing said composition to provide a formable mass;
compressing said formable mass in a vibrating mold under vacuum; and
curing the molded material.

22. The invention as set forth in claim 21 hereof wherein said unsaturated acid is selected from the group consisting of maleic acid, fumaric acid, and itaconic acid.

23. The invention as set forth in claim 22 hereof wherein said diluent is selected from the group consisting of styrene, vinyl toluene, N-vinylpyrrolidone and acrylate and methacrylate esters.

24. The invention as set forth in claim 23 hereof wherein said composite comprises about 94.5 to about 92.5 percent aggregate and from about 5.5 to about 7.5 percent resin precursor.

25. The invention as set forth in claim 24 hereof wherein said resin precursor comprises from about 10 to about 45 parts of diluent and from about 90 to about 55 parts of polyester.

26. The invention as set forth in claim 25 hereof wherein said diluent is styrene.

27. The invention as set forth in claim 26 hereof wherein said resin precursor comprises from about 10 to about 35 parts of styrene and from about 90 to about 65 parts of polyester.

28. The invention as set forth in claim 27 hereof wherein the molecular weight of said polyester is from about 1100 to about 2300.

29. The invention as set forth in claim 27 hereof wherein curing is thermally achieved using a peroxyester initiator and a cobalt salt of an organic acid as the promoter.

30. The invention as set forth in claim 21 hereof wherein said Shore C hardness range is from about 30 to about 50.

31. The invention as set forth in claim 30 hereof wherein said unsaturated acid is selected from the group consisting of maleic acid, fumaric acid and itaconic acid.

32. The invention as set forth in claim 31 hereof wherein said diluent is selected from the group consisting of styrene, vinyl toluene, N-vinylpyrrolidone and acrylate and methacrylate esters.

33. The invention as set forth in claim 32 hereof wherein said composite comprises about 94.5 to about 92.5 percent aggregate and from about 5.5 to about 7.5 percent resin precursor.

34. The invention as set forth in claim 33 hereof wherein said resin precursor comprises from about 10 to about 45 parts of diluent and from about 90 to about 55 parts of polyester.

35. The invention as set forth in claim 34 hereof wherein said diluent is styrene.

36. The invention as set forth in claim 35 hereof wherein said resin precursor comprises from about 10 to about 35 parts of styrene and from about 90 to about 65 parts of polyester.

37. The invention as set forth in claim 36 hereof wherein the molecular weight of said polyester is from about 1100 to about 2300.

38. The invention as set forth in claim 36 hereof wherein curing is thermally achieved using a peroxyester initiator and a cobalt salt of an organic acid as the promoter.

39. The invention as set forth in claim 26 hereof wherein said aggregate comprises particles not larger than about 20 mm in diameter and wherein the tile product is ground and polished to a thickness of not more than about 0.3 inch.

40. The invention as set forth in claim 39 hereof wherein said thickness is not more than about 0.25 inch.

* * * * *